US010836405B2

(12) United States Patent
Wray et al.

(10) Patent No.: US 10,836,405 B2
(45) Date of Patent: Nov. 17, 2020

(54) CONTINUAL PLANNING AND METAREASONING FOR CONTROLLING AN AUTONOMOUS VEHICLE

(71) Applicants: Nissan North America, Inc., Franklin, TN (US); The University of Massachusetts, Boston, MA (US)

(72) Inventors: Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 0 days.

(21) Appl. No.: 16/652,789

(22) PCT Filed: Oct. 30, 2017

(86) PCT No.: PCT/US2017/059057
§ 371 (c)(1),
(2) Date: Apr. 1, 2020

(87) PCT Pub. No.: WO2019/088977
PCT Pub. Date: May 9, 2019

(65) Prior Publication Data
US 2020/0283014 A1 Sep. 10, 2020

(51) Int. Cl.
*B60W 60/00* (2020.01)
*G01C 21/34* (2006.01)
(Continued)

(52) U.S. Cl.
CPC ....... *B60W 60/001* (2020.02); *G01C 21/3407* (2013.01); *G01C 21/3461* (2013.01); *G01C 21/3691* (2013.01)

(58) Field of Classification Search
USPC ..................................................... 701/23–28
See application file for complete search history.

(56) References Cited

U.S. PATENT DOCUMENTS

| 4,751,570 A | 6/1988 | Robinson |
|---|---|---|
| 5,615,116 A | 3/1997 | Gudat et al. |

(Continued)

FOREIGN PATENT DOCUMENTS

| CN | 105635849 A | 6/2016 |
|---|---|---|
| CN | 106103232 A | 11/2016 |

(Continued)

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

(Continued)

*Primary Examiner* — Jonathan L Sample
(74) *Attorney, Agent, or Firm* — Young Basile Hanlon & MacFarlane, P.C.

(57) ABSTRACT

Systems and methods for autonomous vehicle control are disclosed herein. According to some implementations, a method includes a scenario-specific operation control evaluation module (SSOCEM) based on a route of the vehicle. The SSOCEM includes a preferred model and one or more fallback models that respectively determine candidate vehicle control actions. The method includes instantiating a SSOCEM instance based on the SSOCEM. The SSOCEM determines a candidate vehicle control action by determining an approximate amount of time needed to determine a solution to the preferred model and determining an approximate amount of time until the upcoming scenario is reached. When the approximate amount of time needed to determine the solution is less than the approximate amount of time to (Continued)

reach the upcoming scenario, the candidate vehicle control action is determined based on the preferred model; otherwise, the candidate vehicle control action is determined based on a fallback model.

15 Claims, 6 Drawing Sheets

(51) Int. Cl.
 *G01C 21/36* (2006.01)
 *G01C 21/26* (2006.01)

(56) References Cited

U.S. PATENT DOCUMENTS

| | | | |
|---|---|---|---|
| 8,762,006 B2 | 6/2014 | Miller | |
| 8,781,669 B1 | 7/2014 | Teller et al. | |
| 8,849,483 B2 | 9/2014 | Kuwata et al. | |
| 8,884,782 B2 | 11/2014 | Rubin et al. | |
| 9,081,651 B2 | 7/2015 | Filev et al. | |
| 9,103,671 B1* | 8/2015 | Breed | G01S 13/931 |
| 9,494,439 B1* | 11/2016 | Ross | G05D 1/0022 |
| 9,568,915 B1 | 2/2017 | Berntorp et al. | |
| 9,646,428 B1* | 5/2017 | Konrardy | G08G 1/166 |
| 9,972,054 B1* | 5/2018 | Konrardy | G06Q 40/00 |
| 10,029,701 B2* | 7/2018 | Gordon | B60W 40/10 |
| 10,061,326 B2* | 8/2018 | Gordon | B60K 28/14 |
| 10,126,135 B2* | 11/2018 | Mortazavi | G08G 1/096716 |
| 10,185,998 B1* | 1/2019 | Konrardy | G06Q 40/08 |
| 10,319,039 B1* | 6/2019 | Konrardy | G06Q 40/08 |
| 10,599,155 B1* | 3/2020 | Konrardy | B60W 10/04 |
| 2004/0068351 A1 | 4/2004 | Solomon | |
| 2005/0057370 A1 | 3/2005 | Warrior et al. | |
| 2007/0021915 A1 | 1/2007 | Breed et al. | |
| 2009/0088916 A1 | 4/2009 | Elgersma et al. | |
| 2009/0140887 A1* | 6/2009 | Breed | G01S 17/86 340/990 |
| 2011/0016067 A1 | 1/2011 | Levchuk et al. | |
| 2012/0150437 A1 | 6/2012 | Zeng et al. | |
| 2012/0233102 A1 | 9/2012 | James | |
| 2012/0290152 A1 | 11/2012 | Cheung et al. | |
| 2014/0136414 A1 | 5/2014 | Abhyanker | |
| 2014/0222277 A1 | 8/2014 | Tsimhoni et al. | |
| 2014/0309838 A1 | 10/2014 | Ricci | |
| 2015/0039157 A1 | 2/2015 | Wolfe et al. | |
| 2015/0070156 A1 | 3/2015 | Milburn, Jr. | |
| 2015/0081156 A1 | 3/2015 | Trepagnier et al. | |
| 2015/0105961 A1 | 4/2015 | Callow | |
| 2015/0106010 A1 | 4/2015 | Martin et al. | |
| 2015/0153735 A1 | 6/2015 | Clarke et al. | |
| 2015/0183431 A1 | 7/2015 | Nanami | |
| 2015/0253772 A1 | 9/2015 | Solyom et al. | |
| 2015/0329130 A1 | 11/2015 | Carlson et al. | |
| 2015/0345966 A1 | 12/2015 | Meuleau | |
| 2015/0345967 A1 | 12/2015 | Meuleau | |
| 2015/0375748 A1 | 12/2015 | Nagase | |
| 2016/0068158 A1 | 3/2016 | Elwart et al. | |
| 2016/0129907 A1 | 5/2016 | Kim et al. | |
| 2016/0161270 A1 | 6/2016 | Okumura | |
| 2016/0209842 A1* | 7/2016 | Thakur | G05D 1/0088 |
| 2016/0209843 A1* | 7/2016 | Meuleau | G01C 21/3407 |
| 2016/0209848 A1* | 7/2016 | Kojo | G05D 1/0088 |
| 2016/0260328 A1 | 9/2016 | Mishra et al. | |
| 2016/0318511 A1 | 11/2016 | Rangwala | |
| 2016/0334230 A1* | 11/2016 | Ross | G01C 21/3415 |
| 2016/0334797 A1* | 11/2016 | Ross | G06Q 10/08 |
| 2016/0335892 A1 | 11/2016 | Okada et al. | |
| 2016/0375766 A1 | 12/2016 | Konet et al. | |
| 2016/0375768 A1 | 12/2016 | Konet et al. | |
| 2017/0010617 A1 | 1/2017 | Shashua et al. | |
| 2017/0031361 A1 | 2/2017 | Olson et al. | |
| 2017/0032590 A1 | 2/2017 | Stefan et al. | |
| 2017/0038777 A1 | 2/2017 | Harvey | |
| 2017/0090478 A1 | 3/2017 | Blayvas et al. | |
| 2017/0090480 A1* | 3/2017 | Ho | G05D 1/0027 |
| 2017/0102700 A1 | 4/2017 | Kozak | |
| 2017/0158193 A1 | 6/2017 | Lopez et al. | |
| 2017/0215045 A1 | 7/2017 | Rasal et al. | |
| 2017/0225760 A1 | 8/2017 | Sidki et al. | |
| 2017/0236422 A1 | 8/2017 | Naka et al. | |
| 2017/0261325 A1 | 9/2017 | Schroeder et al. | |
| 2017/0262790 A1* | 9/2017 | Khasis | G08G 1/012 |
| 2017/0277193 A1 | 9/2017 | Frazzoli et al. | |
| 2017/0356746 A1 | 12/2017 | Iagnemma | |
| 2018/0004214 A1* | 1/2018 | Wisniowski | G08G 1/096725 |
| 2018/0046191 A1 | 2/2018 | Keller et al. | |
| 2018/0129206 A1 | 5/2018 | Harada et al. | |
| 2018/0232585 A1 | 8/2018 | Kim | |
| 2018/0290657 A1 | 10/2018 | Ryne et al. | |
| 2018/0341880 A1* | 11/2018 | Kislovskiy | G06Q 10/02 |
| 2018/0342033 A1* | 11/2018 | Kislovskiy | G06Q 50/30 |
| 2019/0135281 A1 | 5/2019 | Miura et al. | |
| 2019/0299991 A1 | 10/2019 | Horii et al. | |
| 2019/0329782 A1 | 10/2019 | Shalev-Shwartz et al. | |
| 2020/0079377 A1 | 3/2020 | Yashiro et al. | |
| 2020/0097008 A1 | 3/2020 | Sadat et al. | |

FOREIGN PATENT DOCUMENTS

| | | |
|---|---|---|
| DE | 102012005245 A1 | 9/2012 |
| DE | 102012220134 A1 | 5/2014 |
| DE | 102016203086 A1 | 8/2017 |
| JP | H02-114304 A | 4/1990 |
| JP | 2007179388 A | 7/2007 |
| JP | 2015-199439 A | 11/2015 |
| JP | 2016017914 A | 2/2016 |
| JP | 2016139163 A | 8/2016 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016124178 A1 | 8/2016 |
| WO | 2016130719 A2 | 8/2016 |
| WO | 2017/013746 A1 | 1/2017 |
| WO | 2018147872 A1 | 8/2018 |

OTHER PUBLICATIONS

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.
Kala et al.; Motion Planning of Autonomous Vehicles on a Dual Carriageway without Speed Lanes; Electronics; Jan. 13, 2015.
Matthews et al.; Intent Communication between Autonomous Vehicles and Pedestrians; 2015.
Ragi et al.; UAV path planning in a dynamic environment via partially observable Markov decision process; IEEE Transactions on Aerospace and Electronic Systems; Oct. 8, 2013.
Aoki, S. et al., A Merging Protocol for Self-Driving Vehicles, ICCPS, Apr. 2017.
International Application No. PCT/US2017/017493, filed Feb. 10, 2017.
International Application No. PCT/US2017/017502, filed Feb. 10, 2017.
International Application No. PCT/US2017/017516, filed Feb. 10, 2017.
International Application No. PCT/US2017/017527, filed Feb. 10, 2017.
U.S. Appl. No. 15/621,862, filed Jun. 13, 2017.
Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.
Wray et al., Online Decision-Making for Scalable Autonomous Systems; Conference: Twenty-Sixth International Joint Conference

(56) References Cited

OTHER PUBLICATIONS on Artificial Intelligence; Conference Paper—Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.

Extended European Search Report of corresponding application EP 17895657.9; dated Feb. 25, 2020; 9 pages.

\* cited by examiner

CONTINUAL PLANNING AND METAREASONING FOR CONTROLLING AN AUTONOMOUS VEHICLE

CROSS-REFERENCE TO RELATED APPLICATION

This application is a 371 national stage of International Application Serial No. PCT/US2017/059057, filed Oct. 30, 2017, the entire disclosure of which is hereby incorporated by reference.

TECHNICAL FIELD

This disclosure relates to autonomous vehicle operational management and autonomous driving. In particular, the disclosure relates to controlling an autonomous vehicle using continual planning and metareasoning.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as sensor data representing an operational environment, or a portion thereof, of the vehicle. One issue that arises in the control of autonomous vehicles is the availability of computational resources.

SUMMARY

Disclosed herein are aspects, features, elements, implementations, and embodiments of autonomous vehicle operational management.

According to some implementations of the present disclosure, a method for use in traversing a vehicle transportation network is disclosed. The method includes traversing, by an autonomous vehicle, a vehicle transportation network. Traversing the vehicle transportation network includes determining, by one or more processors, a route of the autonomous vehicle with respect to the vehicle transportation network and determining, by the one or more processors, a scenario-specific operation control evaluation module based on the route of the autonomous vehicle and a location of the autonomous vehicle with respect to an upcoming scenario to be encountered in the vehicle transportation network. The scenario-specific operation control evaluation module includes a preferred model and one or more fallback models that respectively output candidate vehicle control actions based on an operational environment of the autonomous vehicle. Traversing the vehicle transportation network includes instantiating, by the one or more processors, a scenario-specific operational control evaluation module instance based on the scenario-specific operation control evaluation module. Traversing the vehicle transportation network includes determining, by the one or more processors, a candidate vehicle control action. The scenario-specific operational control evaluation module instance determines the candidate vehicle control action by: determining an approximate amount of time needed to determine a solution to the preferred model based on the location of the autonomous vehicle with respect to a scenario location of the upcoming scenario and determining an approximate amount of time until the upcoming scenario is reached by the autonomous vehicle. When the approximate amount of time needed to determine the solution is less than the approximate amount of time until the upcoming scenario is reached, determining the candidate vehicle control action based on the preferred model. When the approximate amount of time needed to determine the solution exceeds the approximate amount of time until the upcoming scenario is reached, determining the candidate vehicle control action based on a fallback model of the one or more fallback models. Traversing the vehicle transportation network further includes traversing a portion of the vehicle transportation network based on the candidate vehicle control action.

According to some implementations of the present disclosure determining the scenario-specific operation control evaluation module includes determining a plurality of upcoming scenarios based on the route, and for each respective upcoming scenario of the plurality of upcoming scenarios, determining a ranking score of the respective upcoming scenario based on a distance between the autonomous vehicle and the respective upcoming scenario and a criticality value of the upcoming scenario, Each respective upcoming scenario has a scenario type attributed to the respective upcoming scenario. Determining the scenario-specific operation control evaluation module further includes ranking the plurality of upcoming scenarios based on the respective ranking scores thereof, and selecting a scenario-specific operation control evaluation module corresponding to a highest ranked upcoming scenario.

According to some implementations of the present disclosure, traversing the vehicle transportation network includes receiving, by the one or more processors, sensor data from one or more sensors of the autonomous vehicle and detecting, by the one or more processors, an unexpected upcoming scenario based on the received sensor data. Traversing the vehicle transportation network further includes determining, by the one or more processors, an additional ranking score of the unexpected upcoming scenario based on a distance between the autonomous vehicle and the unexpected upcoming scenario and a criticality value of the unexpected upcoming scenario, and reranking, by the one or more processors, the plurality of upcoming scenarios with the unexpected upcoming scenario based on the additional ranking score and the respective ranking scores of the plurality of upcoming scenarios. According to some implementations of the present disclosure, reranking the plurality of upcoming scenarios with the unexpected upcoming scenario includes recalculating the respective ranking scores of each of the plurality of upcoming scenarios.

According to some implementations of the present disclosure, determining the candidate vehicle control action based on the preferred model comprises: solving the preferred model based on a scenario type of the upcoming scenario. Furthermore, while solving the model, determining the candidate vehicle control action includes monitoring an available amount of time until the autonomous vehicle reaches the upcoming scenario, determining a degree of convergence of the preferred model, determining whether to use a partial solution to the preferred model or a full solution to the preferred model based on the available amount of time until the autonomous vehicle reaches the upcoming scenario and the degree of convergence. Furthermore, in some scenarios determining the candidate vehicle control action based on the preferred model further comprises receiving sensor data from one or more sensors of the autonomous vehicle and inputting the sensor data into the partial solution to the preferred model, wherein the partial solution to the preferred model outputs the candidate vehicle control action based on the partial solution and the sensor data. In some scenarios, determining the candidate vehicle control action based on the preferred model further comprises receiving sensor data from one or more sensors of the autonomous vehicle, inputting the sensor data into the full solution to the preferred model, wherein the full solution to the preferred model outputs the candidate vehicle control action based on the full solution and the sensor data, and storing the full solution to the preferred model in memory.

According to some implementations of the present disclosure, traversing the vehicle transportation network includes determining, by the one or more processors, a type of the upcoming scenario, determining, by the one or more processors, whether a full solution to the preferred model corresponding to the type of the upcoming scenario is stored in memory, and when the full solution to the preferred model corresponding to the type of the upcoming scenario is stored in memory, determining, by the one or more processors, the candidate vehicle control action based on the full solution to the preferred model.

According to some implementations of the present disclosure, the preferred model is a Partially Observable Markov Decision Process model and the one or more fallback models include a Markov Decision Process model.

According to some implementations of the present disclosure traversing a portion of the vehicle transportation network based on the candidate vehicle control action includes selecting the candidate vehicle control action as a vehicle control action, determining one or more commands to one or more vehicle systems based on the vehicle control action, and issuing the one or more commands to the one or more vehicle systems.

According to some implementations of the present disclosure, an autonomous vehicle is disclosed. The autonomous vehicle includes a memory storing a plurality of scenario-specific operational control evaluation modules. Each scenario-specific operational control evaluation module is configured to handle a different respective upcoming scenario and including a preferred model and one or more fallback models. Each of the preferred model and the one or more fallback models respectively output candidate vehicle actions based on an operational environment of the autonomous vehicle. The autonomous vehicle further includes one or more processors that execute computer-readable instructions. The computer-readable instructions cause the one or more processors to determine a route of the autonomous vehicle with respect to a vehicle transportation network and determine a scenario-specific operation control evaluation module from the plurality of scenario-specific operational control evaluation modules based on the route of the autonomous vehicle and a location of the autonomous vehicle with respect to an upcoming scenario to be encountered in the vehicle transportation network. The computer-readable instructions further cause the one or more processors to instantiate a scenario-specific operational control evaluation module instance based on the scenario-specific operation control evaluation module and determine a candidate vehicle control action. The scenario-specific operational control evaluation module instance determines the candidate vehicle control action by determining an approximate amount of time needed to determine a solution to the preferred model based on the location of the autonomous vehicle with respect to a scenario location of the upcoming scenario and determining an approximate amount of time until the upcoming scenario is reached by the autonomous vehicle. When the approximate amount of time needed to determine the solution is less than the approximate amount of time until the upcoming scenario is reached, the candidate vehicle control action is determined based on the preferred model. When the approximate amount of time needed to determine the solution exceeds the approximate amount of time until the upcoming scenario is reached, the candidate vehicle control action is determined based on a fallback model of the one or more fallback models. The computer-readable instructions further cause the one or more processors to control one or more vehicle systems to traverse a portion of the vehicle transportation network based on the candidate vehicle control action.

According to some implementations of the present disclosure determining the scenario-specific operation control evaluation module includes determining a plurality of upcoming scenarios based on the route, and for each respective upcoming scenario of the plurality of upcoming scenarios, determining a ranking score of the respective upcoming scenario based on a distance between the autonomous vehicle and the respective upcoming scenario and a criticality value of the upcoming scenario, Each respective upcoming scenario has a scenario type attributed to the respective upcoming scenario. Determining the scenario-specific operation control evaluation module further includes ranking the plurality of upcoming scenarios based on the respective ranking scores thereof, and selecting a scenario-specific operation control evaluation module corresponding to a highest ranked upcoming scenario.

According to some implementations of the present disclosure, the computer-readable instructions further cause the one or more processors to receive sensor data from one or more sensors of the autonomous vehicle, detect an unexpected upcoming scenario based on the received sensor data, determine an additional ranking score of the unexpected upcoming scenario based on a distance between the autonomous vehicle and the unexpected upcoming scenario and a criticality value of the unexpected upcoming scenario, and rerank the plurality of upcoming scenarios with the unexpected upcoming scenario based on the additional ranking score and the respective ranking scores of the plurality of upcoming scenarios. Reranking the plurality of upcoming scenarios with the unexpected upcoming scenario may include recalculating the respective ranking scores of each of the plurality of upcoming scenarios.

According to some implementations of the present disclosure, determining the candidate vehicle control action based on the preferred model comprises solving the preferred model based on a scenario type of the upcoming scenario. Furthermore, while solving the preferred model, determining the vehicle control action includes monitoring an available amount of time until the autonomous vehicle reaches the upcoming scenario, determining a degree of convergence of the preferred model, and determining whether to use a partial solution to the preferred model or a full solution to the preferred model based on the available amount of time until the autonomous vehicle reaches the upcoming scenario and the degree of convergence. In some scenarios determining the candidate vehicle control action based on the preferred model further comprises receiving sensor data from one or more sensors of the autonomous vehicle and inputting the sensor data into the partial solution to the preferred model, wherein the partial solution to the preferred model outputs the candidate vehicle control action based on the partial solution and the sensor data. In some scenarios determining the candidate vehicle control action based on the preferred model further comprises receiving sensor data from one or more sensors of the autonomous vehicle, inputting the sensor data into the full solution to the preferred model, wherein the full solution to the preferred model outputs the candidate vehicle control action based on the full solution and the sensor data, and storing the full solution to the preferred model in memory.

According to some implementations of the present disclosure, the computer-readable instructions further cause the one or more processors to determine a type of the upcoming scenario, determine whether a full solution to the preferred model corresponding to the type of the upcoming scenario is stored in memory, and when the full solution to the preferred model corresponding to the type of the upcoming scenario is stored in memory, determine the candidate vehicle control action based on the full solution to the preferred model.

According to some implementations of the present disclosure, the preferred model is a Partially Observable Markov Decision Process model and the one or more fallback models include a Markov Decision Process model.

According to some implementations of the present disclosure, controlling one or more systems to traverse a portion of the vehicle transportation network based on the candidate vehicle control action includes selecting the candidate vehicle control action as a vehicle control action, determining one or more commands to one or more vehicle systems based on the vehicle control action, and issuing the one or more commands to the vehicle system.

Variations in these and other aspects, features, elements, implementations, and embodiments of the methods, apparatus, procedures, and algorithms disclosed herein are described in further detail hereafter. One issue that arises in the control of autonomous vehicles is the availability of computational resources.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
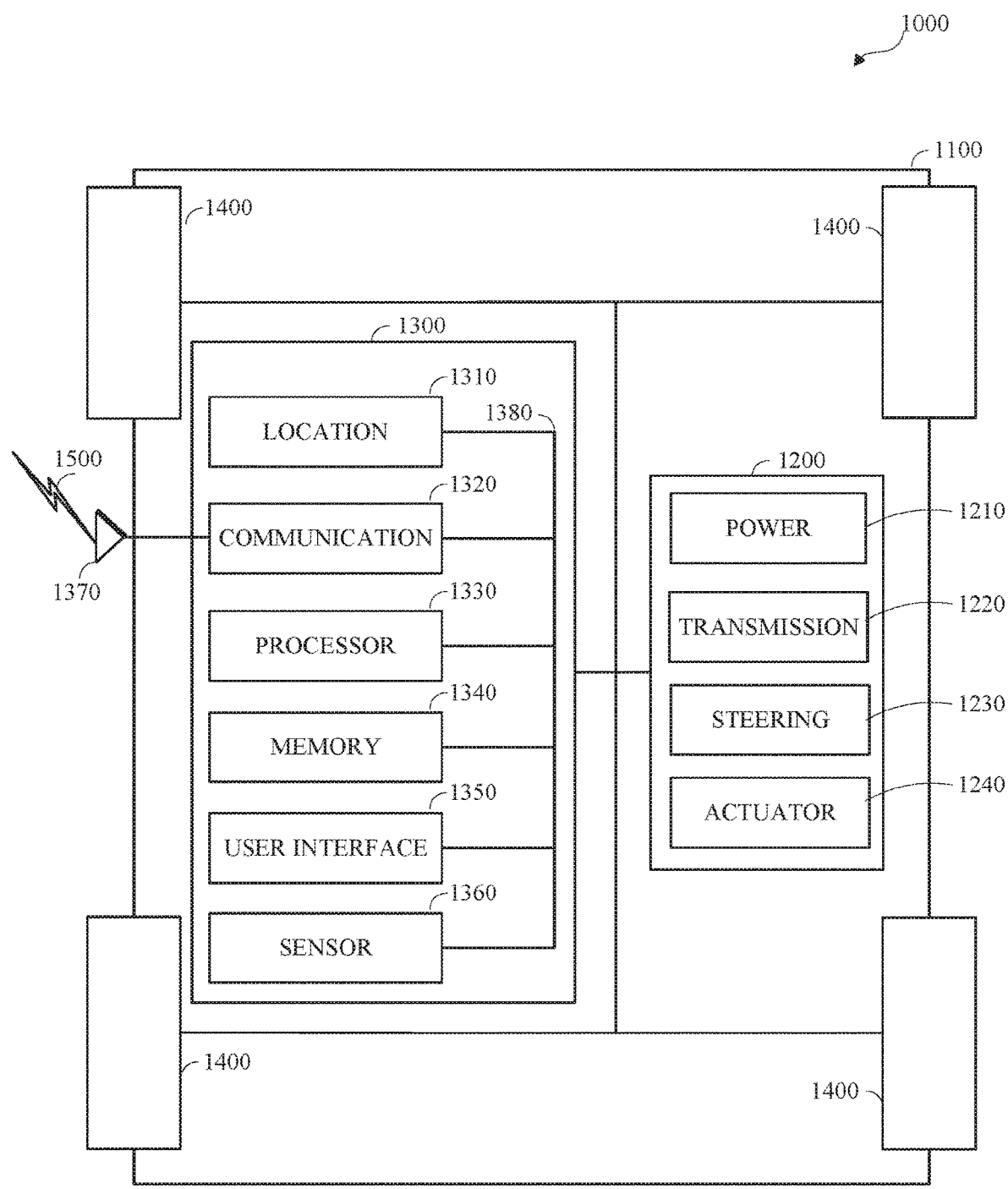
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network (e.g., a road). The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules (SSOCEM). Each scenario-specific operational control evaluation module may include a preferred model (e.g., a Partially Observable Markov Decision Process (POMDP) model), and one or more fallback models (e.g., a Markov Decision Process (MDP) model and/or expert logic). The preferred model and the one or more fallback models are configured to handle a specific scenario. The autonomous vehicle operational management controller may instantiate respective instances of the SSOCEMs in response to detecting the corresponding operational scenarios.

The autonomous vehicle operational management controller may receive candidate vehicle control actions from respective instantiated SSOCEM instances, may identify a vehicle control action from the candidate vehicle control actions, and may control the autonomous vehicle to traverse a portion of the vehicle transportation network according to the identified vehicle control action.

One issue that arises is that the computational resources available to the autonomous vehicle are limited. Further compounding this issue is that in some implementations, the preferred model, and even some fallback models may need to be solved as the vehicle encounters different scenarios. Solving a model may take a number of seconds or minutes depending on the complexity of the scenario. Thus, in some implementations, the autonomous vehicle is configured to identify upcoming scenarios based on a route of a vehicle. The autonomous vehicle may rank the upcoming scenarios based on the respective distances between the autonomous vehicle and the upcoming scenarios, as well as the criticality of each upcoming scenario. The autonomous vehicle may deploy SSOCEMs corresponding to the rankings of the upcoming scenarios, thereby efficiently scheduling the deployment of the SSOCEMs. Furthermore, once deployed, an instance of an SSOCEM may determine if it has adequate time to solve the preferred model or whether the SSOCEM should rely on a fallback model to determine the candidate vehicle control action. When the SSOCEM chooses to solve the preferred model, the SSOCEM may monitor the progress of the solution, so as to determine whether to continue solving the preferred model, to use a partial solution to the preferred model to determine the candidate vehicle control action, or to rely on a fallback model to determine the candidate vehicle control action. When the SSOCEM determines a full solution to the preferred model, the SSOCEM may use the full solution to determine a candidate vehicle control action and then may store the full solution in the memory of the autonomous vehicle. In this way, future instances of the SSOCEM may use the full solution to the model without straining the computational resources of the autonomous vehicle.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. In the embodiment shown, a vehicle 1000 includes various vehicle systems, including a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 may be controlled by the controller 1300, the actuator 1240, or both and controls the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
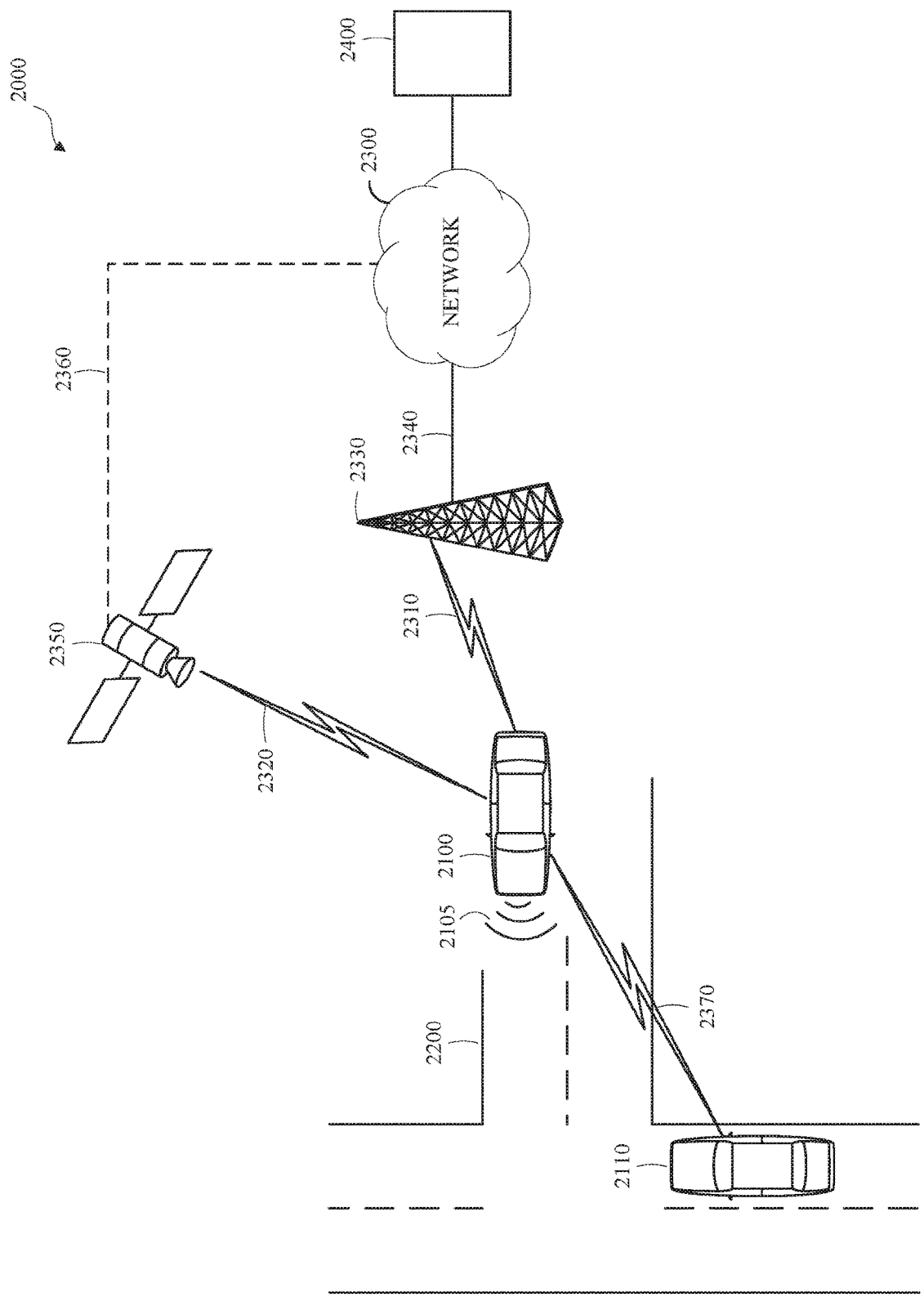
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/

2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensors 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
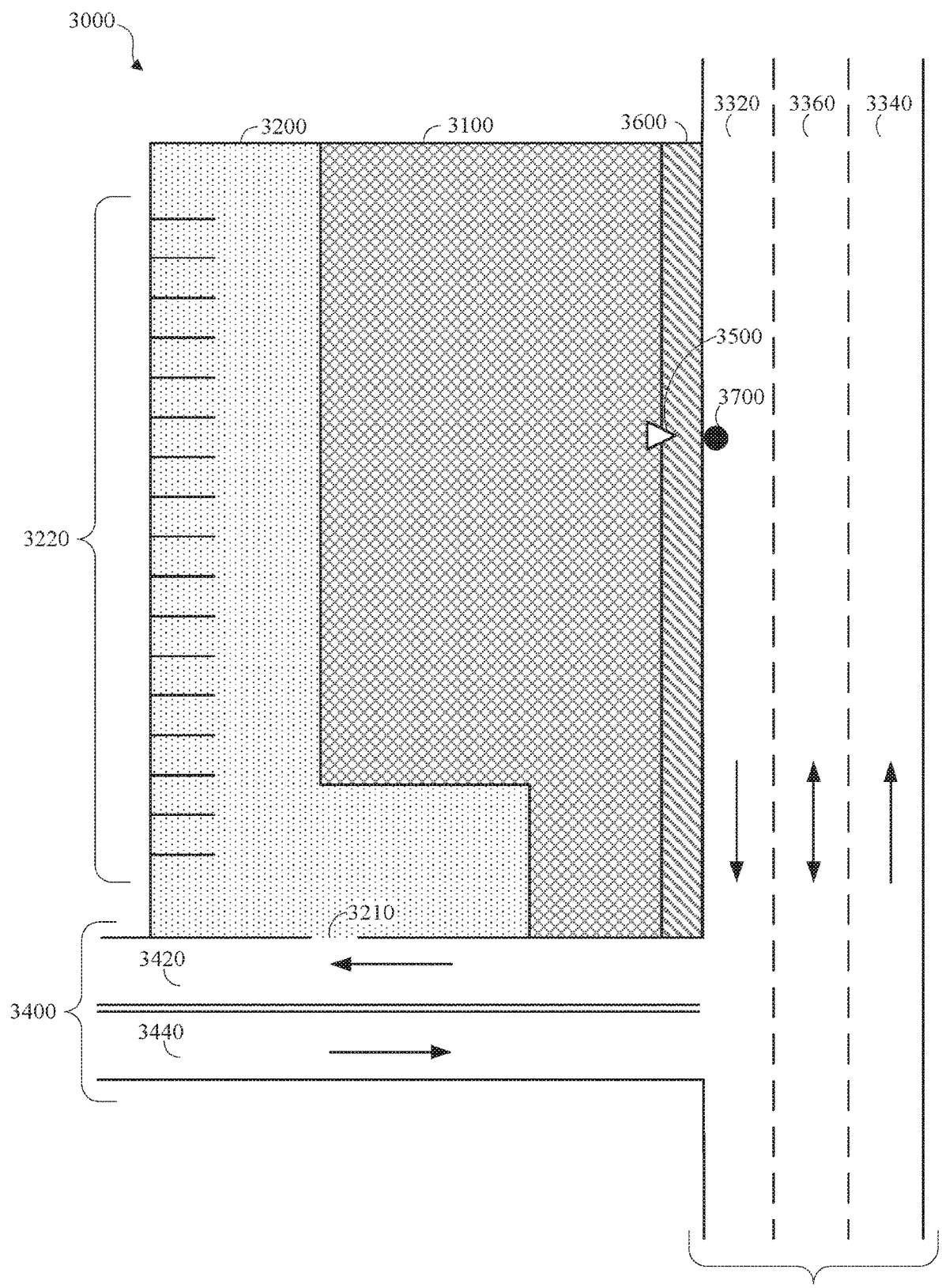
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 300 shown in FIG. 3 includes an interchange 3210 between the parking area 3200 and road 3400. A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3.

A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed. The vehicle transportation network information may include docking location information, such as information identifying a geolocation of the docking location 3700. Although not shown separately in FIG. 3, docking location information may identify a type of docking operation associated with a docking location 3700. For example, a destination may be associated with a first docking location for passenger loading and a second docking location for passenger unloading.

Figure 4:
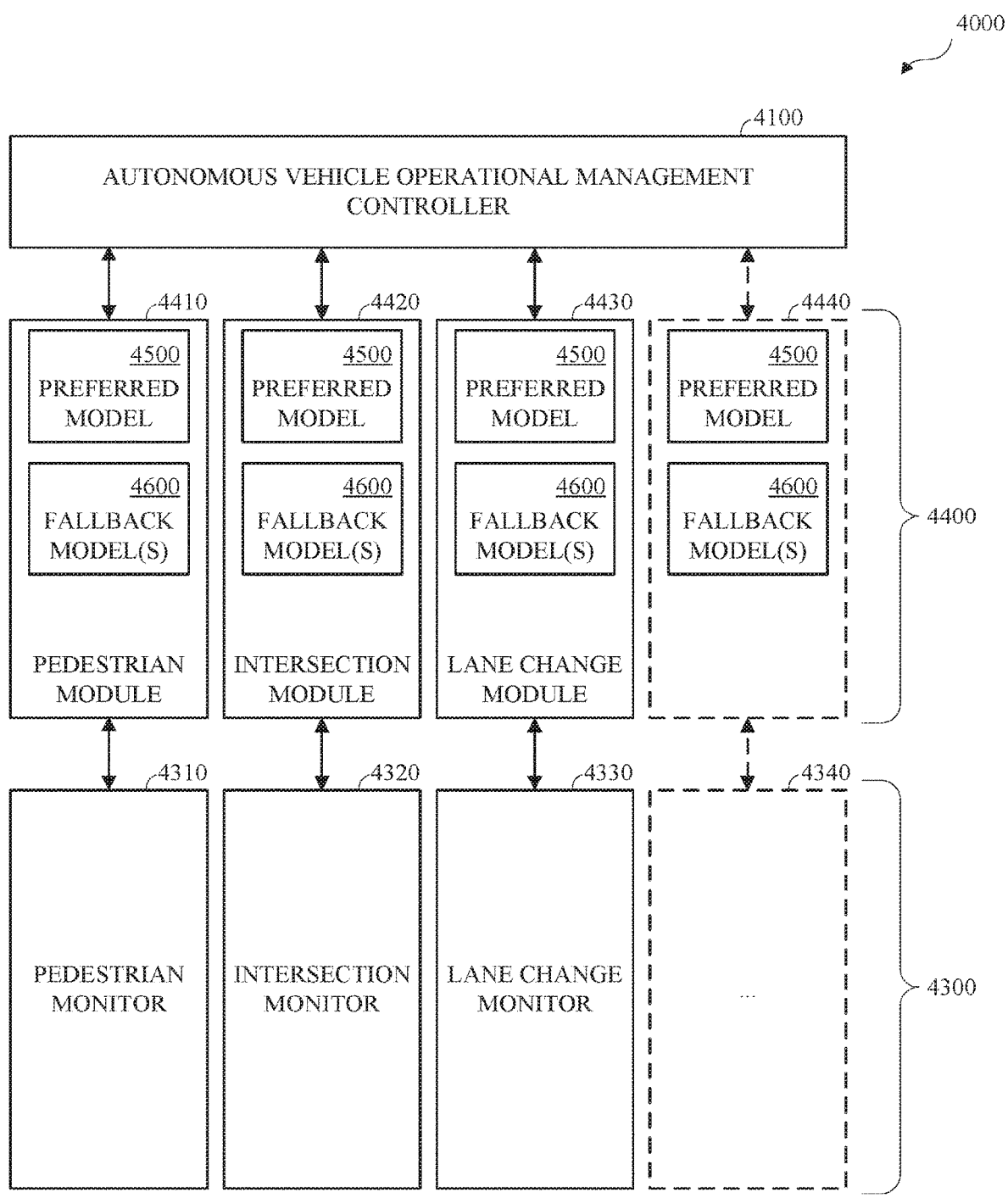
FIG. 4 is a diagram of an example of an autonomous vehicle operational management system in accordance with some embodiments of the present disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (or "scenario") may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios including a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes.

For simplicity and clarity, similar vehicle operational scenarios may be described herein with reference to vehicle operational scenario types or classes. A type or class of a vehicle operation scenario may refer to a particular pattern or set of patterns of the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action. Examples of vehicle control actions include a 'stop' vehicle control action, an 'advance' vehicle control action (e.g., the autonomous vehicle moves a short distance slowly), an 'accelerate' vehicle control action, a 'decelerate' vehicle control action, a 'maintain' vehicle control action (e.g., the autonomous vehicle maintains its speed), a 'turn' vehicle control action (which may include an angle of a turn), or any other standard vehicle operations. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include an autonomous vehicle operational management controller 4100, operational environment monitors 4300, scenario-specific operation control evaluation modules 4400 ("SSOCEM"), or a combination thereof.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle. For example, the operational environment information may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. In another example, the operational environment information may include information representing the vehicle transportation network proximate to the autonomous vehicle, such as within a defined spatial distance (e.g., 300 meters) of the autonomous vehicle, information indicating the geometry of one or more aspects of the vehicle transportation network, information indicating a condition, such as a surface condition, of the vehicle transportation network, or any combination thereof. In another example, the operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

The autonomous vehicle operational management controller 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the autonomous vehicle operational management controller 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310 (pedestrian monitor), an intersection operational environment monitor 4320 (intersection monitor), a lane change operational environment monitor 4330 (lane change monitor), or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios. An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, or the like. An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information. An operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

In another example, the intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection operational environment monitor 4320 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection operational environment monitor 4320 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

In another example, lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a current or expected lane change operation, the lane change operational environment monitor 4330 may associate the sensor data with one or more identified remote vehicles in the operational environment of the autonomous vehicle, one or more aspects of the operational environment of the autonomous vehicle or a combination thereof geospatially corresponding to a current or expected lane change operation, which may include may identifying a current or expected direction of travel, a path, such as an expected path, a current or expected velocity, a current or expected acceleration rate, or a combination thereof for one or more of the respective identified remote vehicles, and the lane change operational environment monitor 4330 may output the identified, associated, or generated lane change information to, or for access by, the autonomous vehicle operational management controller 4100.

The autonomous vehicle operational management controller 4100 may identify one or more distinct vehicle operational scenarios based on one or more aspects of the operational environment represented by the operational environment information. For example, the autonomous vehicle operational management controller 4100 may identify a distinct vehicle operational scenario in response to identifying, or based on, the operational environment information indicated by one or more of the operational environment monitors 4300.

The autonomous vehicle operational management controller 4100 may identify multiple distinct vehicle operational scenarios based on one or more aspects of the operational environment represented by the operational environment information. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate the instance of the SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive operational environment information, including sensor data, to determine and output a candidate vehicle control action. A candidate vehicle control action is a vehicle control action that is identified by the particular SSOCEM 4400 as the likely optimal action for the vehicle to perform to handle a particular scenario. For instance, a SSOCEM 4400 configured to handle intersections (e.g., an intersection SSOCEM 4420) may output a "proceed" candidate vehicle control action that suggests proceeding through an intersection. At the same time, a SSOCEM 4400 for handling lane changes (e.g., the lane change SSOCEM 4430) may output a "turn left" candidate vehicle control action indicating that the autonomous vehicle should merge left by two degrees. In some implementations, each SSOCEM 4400 outputs a confidence score indicating a degree of confidence in the candidate vehicle control action determined by the SSOCEM 4400. For instance, a confidence score greater than 0.95 may indicate a very high confidence in the candidate vehicle control action, while a confidence score less than 0.5 may indicate a relatively low degree of confidence in the candidate vehicle control action.

The autonomous vehicle operational management controller 4100 receives the candidate vehicle control actions and determines a vehicle control action based on the received candidate vehicle control actions. In some implementations, the autonomous vehicle operational management controller 4100 utilizes hardcoded logic to determine the vehicle control action. For example, the autonomous vehicle operational management controller 4100 may select the candidate vehicle control action having the highest confidence score. In other implementations, the autonomous vehicle operational management controller 4100 may select the candidate vehicle control action that is the least likely to result in a collision. In other implementations, the autonomous vehicle operational management controller 4100 may generate a compound action based on two or more non-conflicting candidate vehicle control actions (e.g., compounding "proceed" and "turn left by two degrees" to result in an vehicle control action that causes the vehicle to veer left and proceed through an intersection). In some implementations, the autonomous vehicle operational management controller 4100 may utilize a machine learning algorithm to determine a vehicle control action based on two or more differing candidate vehicle control actions.

A SSOCEM 4400 may include two or more models that are configured to determine one or more vehicle control actions for handling a scenario given a set of inputs. The two or more models may include a preferred model 4500 and one or more fallback models 4600. Models may include, but are not limited to, Partially Observable Markov Decision Process (POMDP) models, Markov Decision Process (MDP) models, Classical Planning models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 may further include computer-executable instructions for determining whether to utilize the preferred model 4500 or to utilize one of the one or more fallback models 4600. In some implementations, the preferred models 4500 may provide a more robust framework, but may take seconds or minutes to solve. Thus, the fallback models provide a reliable, but less computationally expensive alternative to the preferred model. Each SSOCEM includes computer-executable instructions that define a manner by which the models operate and a manner by which the models are utilized. Furthermore, in some implementations, each SSOCEM 4400 includes instructions that are used to determine whether to use a partially solved model (discussed further below), rather than waiting for the SSOCEM 4400 to fully solve a preferred model 4500.

In some implementations, a SSOCEM 4400 determines a solution to the preferred model given the type of the scenario that an instance of the SSOCEM 4400 is to handle. For example, in the case that the preferred model is a POMDP, an instantiated SSOCEM 4400 solves the model to determine a set of all possible states and state transitions given a type of scenario. A model may be considered fully solved when the model converges. A POMDP is defined by a tuple <S, A, $\Omega$, T, O, R>, where S is the set of possible states, A is a set of possible actions, and $\Omega$ is a set of observations. T: S×A×S→[0, 1] describes how the environmental states change dynamically with respect to the actions taken by the autonomous vehicle. O: A×S×$\Omega$→[0, 1] describes how observations are stochastically produced by new environment states once an action has been taken by the autonomous vehicle. R is the reward function, which may be defined as a unit cost for all states, except the goal state. Given the definition of a POMDP, the SSOCEM solves the POMDP by constructing a policy that maximizes an objective function. The objective function combines partial rewards (at each step) over multiple steps. At each step, the SSOCEM determines whether a state transition, which may be a transition from one state to another state resulting from an action, results in a reward or a penalty. This determination (i.e., reward or penalty) may be used to update the objective function (e.g., decrement the objective function in the case of a penalty and increment the objective function in the case of reward). Thus, as the SSOCEM 4400 iterates through all the possible state transitions while updating the objective function at each step. At each step (or every nth step), the SSOCEM 4400 can determine whether the objective function is increasing, decreasing, or remaining relatively flat. After observing little or no change in the objective function over multiple steps, the SSOCEM 4400 determines that the solution to the POMDP has converged.

By fully solving the POMDP, the SSOCEM 4400 is configured to receive operational environment information, including sensor data received from the sensors of the autonomous vehicle, and to determine a candidate vehicle control action based on the fully solved model. Candidate vehicle control actions determined by a fully solved model have a higher degree of reliability. One issue that may arise, however, is that fully solving a model is a computationally expensive process that increases the demand on the processor(s) of the autonomous vehicle, as well as, an increased amount of time.

As there may be multiple SSOCEMs 4400 operating concurrently, and the autonomous vehicle may be approaching a particular scenario that requires action, there are instances where the SSOCEM 4400 cannot fully solve a model before the particular scenario is encountered. Thus, the SSOCEMs 4400 may be configured to determine whether to use a fallback model 4600 or to solve the preferred model 4500. Initially, the SSOCEM 4400 determines whether the preferred model 4500 has been solved for the particular type of a scenario previously (e.g., is a solution to the preferred model 4500 for a particular type of scenario stored in the memory of the autonomous vehicle). If the SSOCEM 4400 determines that the preferred model 4500 has been solved for the type of scenario, the SSOCEM 4400 utilizes the preferred model 4500. If the SSOCEM 4400 determines that the preferred model 4500 has not yet been solved for the type of the upcoming scenario, the preferred model 4500 determines whether to solve and utilize the preferred model 4500 or to utilize a fallback model 4600. In some implementations, the SSOCEM 4400 determines an approximate amount of time until the SSOCEM 4400 needs to determine a candidate vehicle control action (e.g., an approximate amount of time until the autonomous vehicle reaches the upcoming scenario) and an approximate amount of time required to solve the model for the particular scenario. In some implementations, the SSOCEM 4400 may include metadata that indicates approximate times to solve the preferred model 4500 hardcoded therein. Alternatively, the SSOCEM 4400 may include a lookup table that relates scenario types to the amount of time needed to solve a model given the respective scenario type. If the approximate amount of time required to solve the preferred model is greater than the approximate amount of time until the SSOCEM 4400 needs to provide a candidate vehicle control action, the SSOCEM 4400 determines to use the fallback model 4600. If the approximate amount of time required to solve the preferred model 4500 is less than the approximate amount of time until the SSOCEM 4400 needs to provide a candidate vehicle control action, the SSOCEM 4400 determines to solve the preferred model 4500 and to utilize the solution to the preferred model to determine the candidate vehicle control action. The amount of time until the SSOCEM 4400 needs to provide a candidate vehicle control action may be the approximate amount of time until the vehicle reaches the upcoming scenario. The approximate amount of time to solve a preferred model 4500 may be an approximation of the amount of time needed to fully solve the preferred model, or an approximation of the amount of time needed to partially solve the model.

For example, the models defined in an intersection SSOCEM 4420 may be configured to handle any type of intersection (e.g., three way stop, four way stop with stop signs, a four way stop sign with traffic lights, a six way stop, a four way stop with a blinking light, etc.). For each type of intersection-specific scenario, the intersection SSOCEM 4420 must either solve the preferred model 4500 (e.g., a POMDP) or may utilize a less complex model (e.g., an MPD or hard-coded instructions). In operation, the intersection operational environment monitor 4320 may identify an upcoming scenario (i.e., an intersection) to the autonomous vehicle operational management controller 4100 and a type of the scenario. In response to the determination, the autonomous vehicle operational management controller 4100 may instantiate an instance of an intersection SSOCEM 4420. The instance of the intersection SSOCEM 4420 determines whether the autonomous vehicle has a solution to the preferred model for the particular type of a scenario (e.g., a solution to the POMDP for handling a four way stop with stop signs). If so, the intersection SSOCEM 4420 can select the previous solution to the model for the particular type. If, however, the intersection SSOCEM 4420 determines that there are no solutions to the preferred model 4500 for the particular type of scenario, then the intersection SSOCEM 4420 determines whether to solve and utilize the preferred model 4500 or to utilize on the fallback model 4600 based on the approximate amount of time until the autonomous vehicle reaches the intersection and the approximate amount of time that the intersection SSOCEM 4420 needs to at least partially solve the preferred model 4500. If the intersection SSOCEM 4420 determines that the approximate amount of time until the autonomous vehicle reaches the intersection is greater than the approximate amount of time needed to solve the preferred model, the intersection SSOCEM 4420 begins solving the preferred model 4500 and utilizes the solution to the preferred model 4500 to determine the candidate vehicle control action. If the intersection SSOCEM 4420 determines that the approximate amount of time until the autonomous vehicle reaches the intersection is less than the approximate amount of time needed to solve the preferred model, the intersection SSOCEM 4420 utilizes a fallback model 4600 to determine the candidate vehicle control action. For example, the intersection SSOCEM 4420 may utilize the MDP or hardcoded expert logic to determine the candidate vehicle control action. To determine the candidate vehicle control action, the intersection SSOCEM 4420 obtains operational environment information, including sensor data obtained from the vehicle sensors, and inputs the operational environment information into the model (i.e., the solution to the preferred model 4500 or the fallback models). The model then outputs the candidate vehicle control action, which is output to the autonomous vehicle operational management controller 4100.

When an SSOCEM 4400 determines that the SSOCEM 4400 has sufficient time to solve the preferred model 4500, the SSOCEM 4400 may begin solving the preferred model 4500. In doing so, the SSOCEM 4400 may perform a number of iterations until the preferred model 4500 converges on a solution. During the solving of the preferred model 4500, the SSOCEM 4400 may monitor the progress of the solution. The progress of the solution may be measured by a degree of convergence of the solution to the preferred model 4500. At each nth iteration or when the autonomous vehicle approaches the upcoming scenario (e.g., within a certain distance threshold), the SSOCEM 4400 may determine the degree of convergence of the solution to the preferred model 4500. For example, at each iteration, the SSOCEM 4400 may compute an expected value for the current solution. The expected value of the current solution may be a measure of how desirable the current solution is in terms of an expected future reward if the SSOCEM follows this solution. After each (or nth) iteration, the SSOCEM 4400 can compute a difference between the previous expected value and the current expected value to determine whether the solution is improving. The SSOCEM 4400 may implement a function that computes a maximal number of iterations until the difference between the previous and current value is less than a threshold (when the model is said to have converged). The difference between the values indicates the degree of convergence, as well as an approximate number of iterations until the solution converges. If the solution to the preferred model 4500 has not fully converged, the SSOCEM 4400 determines a degree of convergence of the solution, an approximate amount of time (which may be measured in expected iterations) until the model converges, and an approximate amount of time until the autonomous vehicle reaches the upcoming scenario. Based on these factors, the SSOCEM 4400 can determine whether to wait until the solution fully converges, whether to utilize a partial solution to the preferred model, or to rely on a fallback model. If the approximate amount of time until the autonomous vehicle reaches the upcoming scenario is greater than the approximate amount of time until the solution fully converges, the SSOCEM 4400 continues to solve the preferred model 4500. If the approximate amount of time until the autonomous vehicle reaches the upcoming scenario is less than the approximate amount of time until the solution fully converges, the SSOCEM 4400 determines whether to use a partial solution to preferred model 4500 or to rely on the fallback model 4600. If the degree of convergence of the solution is greater than a threshold (e.g., >80% converged), the SSOCEM 4400 may determine to use the partial solution to the preferred model to determine the candidate vehicle control action. If the degree of convergence of the solution is less than the threshold, the SSOCEM 4400 may utilize a fallback model 4600 (e.g., an MDP or hardcoded expert logic) to determine the candidate vehicle control action.

In some implementations, the autonomous vehicle operational management controller 4100 (or a SSOCEM 4400) is configured to store a solution to a preferred model 4500 in the memory of the autonomous vehicle upon a respective SSOCEM 4400 determining a full solution to the preferred model 4500 for a particular type of scenario. In these implementations, the autonomous vehicle operational management controller 4100 (or a SSOCEM 4400) may determine that a respective SSOCEM 4400 determined a full solution to a preferred model 4500 for a particular type of a scenario. In some implementations, the stored solution to a preferred model 4500 may be indexed by a scenario key (e.g., an intersection) and a type key that defines the specific type of a scenario (e.g., six-way intersection). In this way, in subsequent iterations, when the autonomous vehicle identifies an upcoming scenario that is of the same type or is substantially similar to the situation type solved by the SSOCEM 4400, another instance of the SSOCEM 4400 may utilize the solution to the preferred model 4500. As a result, processing resources may be conserved, and the autonomous vehicle may rely on a more robust model (e.g., a POMDP).

Once the autonomous vehicle operational management controller 4100 determines that a scenario has been handled, the autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

As was previously mentioned, computational resources in an autonomous vehicle are limited. Thus, in some implementations, the autonomous vehicle operational management controller 4100 is configured to identify SSOCEMs 4400 configured to handle upcoming scenarios and to schedule the instantiation of the identified SSOCEMs 440 based on a distance to the upcoming scenarios, a criticality of the upcoming scenarios, and other suitable factors. In doing so, the autonomous vehicle operational management controller 4100 is able to efficiently manage the instantiation of SSOCEMs 4400, which reduces the burden on the computational resources of the autonomous vehicle.

In operation, the autonomous vehicle operational management controller 4100 obtains a route of the autonomous vehicle. For example, a user may enter a destination for the autonomous vehicle. In response to the user entry of a destination, the autonomous vehicle operational management controller 4100 (or another component) may obtain a route of the autonomous vehicle beginning at a current location of the autonomous vehicle. The autonomous vehicle operational management controller 4100 may provide the route to the various operational environment monitors 4300. For example, the intersection operational environment monitor 4320 may scan the route to determine any intersections that are to be encountered along the route of the autonomous vehicle. For each intersection, the intersection operational environment monitor 4320 may identify the intersection relative to the route and/or the current location of the autonomous vehicle, and may also identify any additional features of the intersection. For example, the additional features may include whether there are traffic lights, whether there are stop signs, which lanes have a right of way, how many streets intersect, the direction of traffic at the intersection, etc. Similarly, the lane change operational environment monitor 4330 may identify locations along the route where there are lane merges (e.g., a merging of two or more lanes). For each identified lane merge, the lane change operational environment monitor 4330 may identify additional features of the lane merge, including identifying the lane that is ending, how many lanes leading up to the lane merge, and how many lanes remain after the lane merge. The foregoing are examples that are not meant to limit the scope of the disclosure. The autonomous vehicle operational management controller 4100 may communicate with other operational environment monitors 4300 that receive the route and identify upcoming scenarios on the route.

The autonomous vehicle operational management controller 4100 receives various upcoming scenarios from the operational environment monitors 4300 and the locations of the upcoming scenarios. For each upcoming scenario, the autonomous vehicle operational management controller 4100 may determine a distance between the autonomous vehicle and the upcoming scenario. Furthermore, the autonomous vehicle operational management controller 4100 may, for each identified upcoming scenario, identify a SSOCEM 4400 that is configured to handle the identified upcoming scenario. Each identified SSOCEM 4400 may include a criticality value that indicates a degree of criticality of the scenario handled by the respective SSOCEM 4400. For each upcoming scenario, the autonomous vehicle operational management controller 4100 may determine a ranking score of the upcoming scenario based on the distance between the autonomous vehicle and the upcoming scenario and the criticality of the upcoming scenario. For instance, the autonomous vehicle operational management controller 4100 may implement a function that receives the criticality value and the distance between the autonomous vehicle and the upcoming scenario and outputs a ranking score based on these values. The function may be any suitable function, including a weighted function. The function may receive additional parameters as well, such as the average time to solve the preferred model 4500 defined in the SSOCEM 4400.

Upon determining the ranking score of each upcoming scenario, the autonomous vehicle operational management controller 4100 ranks each upcoming scenario based on the ranking score and the ranking score of the other upcoming scenarios. The autonomous vehicle operational management controller 4100 may then begin instantiating SSOCEMs 4400 based on the ranked upcoming scenarios. For instance, the autonomous vehicle operational management controller 4100 may instantiate the SSOCEMs 4400 corresponding to the n-highest ranked upcoming scenarios (e.g., the three-highest ranked upcoming scenarios). Upon instantiating the SSOCEMs 4400, the SSOCEMs 4400 may determine whether to solve the preferred model 4500 or to rely on one of the one or more fallback models 4600, as was described above.

As the autonomous vehicle traverses the vehicle transportation network, the autonomous vehicle will encounter unexpected scenarios. For example, the autonomous vehicle may encounter a pedestrian that is about to jaywalk or another vehicle driving in front of the autonomous vehicle. The operational environment monitors 4300 are configured to identify upcoming scenarios, including unexpected scenarios. Each time a monitor identifies an unexpected scenario, the autonomous vehicle operational management controller 4100 may recalculate the ranking score of all of the upcoming scenarios that have not been dealt with. Put another way, each time a new upcoming scenario is identified by one of the operational environment monitors 4300, the autonomous vehicle operational management controller 4100 may determine the distance between the autonomous vehicle and each respective upcoming scenario. The autonomous vehicle operational management controller 4100 may then determine the ranking score of each respective upcoming scenario based on the distance between the autonomous vehicle and the respective upcoming scenario, the criticality of the upcoming scenario, and any other suitable factors. The autonomous vehicle operational management controller 4100 may then re-rank the upcoming scenarios based on the determined ranking scores of the respective upcoming scenarios. The autonomous vehicle operational management controller 4100 then determines which SSOCEMs 4400 to instantiate based on the reranked upcoming scenarios. In this way, the autonomous vehicle operational management controller 4100 can schedule the deployment of SSOCEMs 4400 corresponding to unexpected upcoming scenarios as the autonomous vehicle operational management controller 4100 becomes aware of the unexpected upcoming scenarios. Once selected for instantiation, the autonomous vehicle operational management controller 4100 may instantiate an SSOCEM 4400 for an unexpected upcoming scenario in the manner described above. Once instantiated, an instance of the SSOCEM 4400 receives operational environment information, including sensor data, and determines a candidate vehicle control action based on the operational environment information.

In some implementations, each SSOCEM 4400 may be configured to self-monitor for one or more error conditions. For example, if the SSOCEM 4400 cannot load or operate on the preferred model 4500, the SSOCEM 4400 may identify an error condition. In the case of an error condition, the SSOCEM 4400 may include hardcoded instructions that are intended to reduce the likelihood of a collision. For example, the SSOCEM 4400 may output a candidate vehicle control action that instructs the autonomous vehicle operational management controller 4100 to relinquish control to the driver or to pull over to the side of the road and stop the autonomous vehicle.

Figure 5:
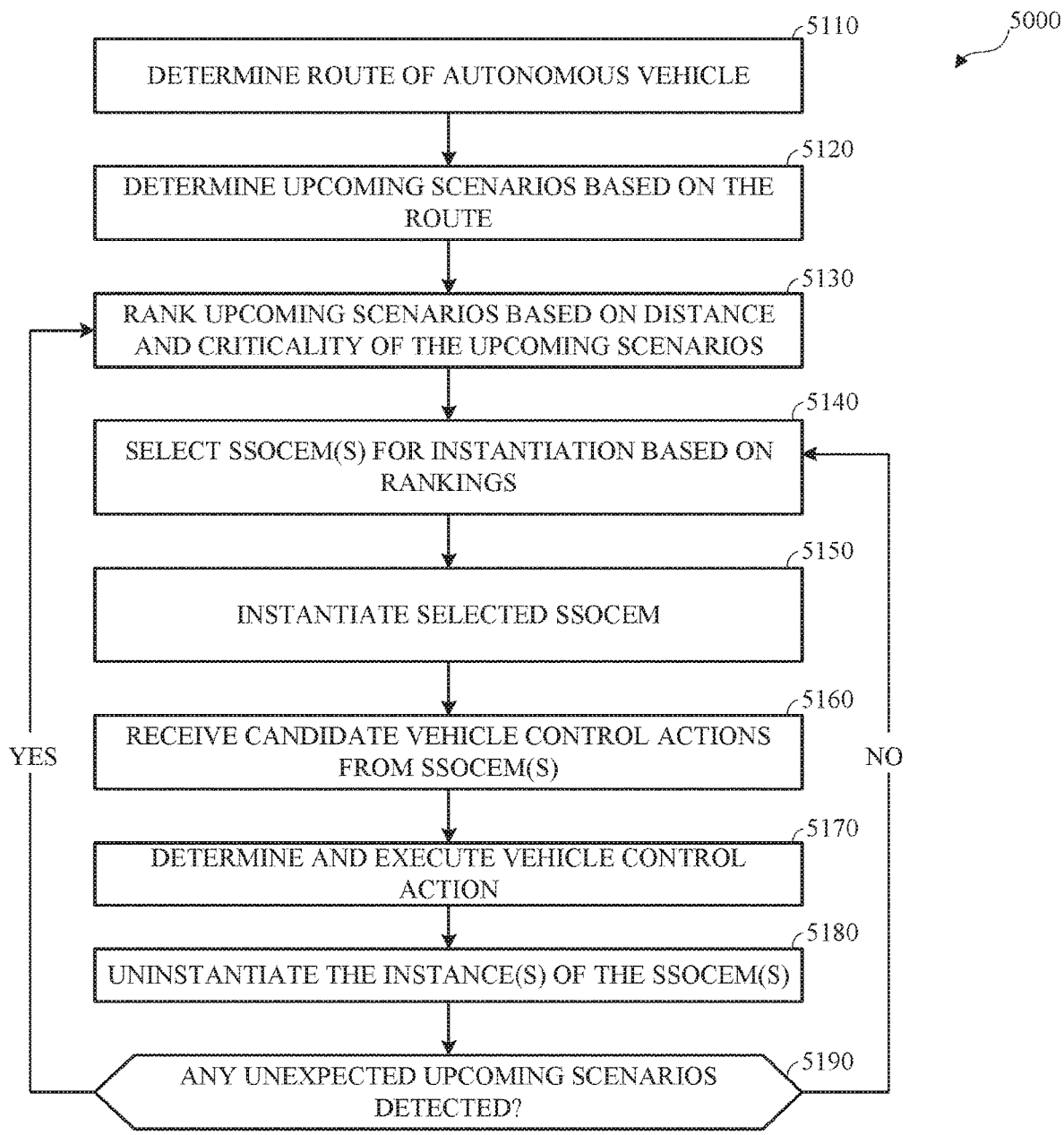
FIG. 5 is a flow diagram illustrating an example set of operations of a method for controlling an autonomous vehicle in accordance with some embodiments of the present disclosure.

FIG. 5 illustrates an example set of operations of a method 5000 for controlling an autonomous vehicle. The method 5000 of FIG. 5 is described with respect to the autonomous vehicle operational management controller 4100. The method 5000 may, however, be executed by any other suitable component.

At 5110, the autonomous vehicle operational management controller 4100 determines the route of the autonomous vehicle. The route of the autonomous vehicle may be determined in response to a user entering a destination. In response to the destination, the autonomous vehicle operational management controller 4100 (or another vehicle component) may determine the route by, for example, loading one or more maps stored in the memory of the autonomous vehicle and charting a route based on the destination and current location of the autonomous vehicle. Alternatively, the autonomous vehicle operational management controller 4100 (or another vehicle component) may determine the route by transmitting the destination and current location of the autonomous vehicle to a remote server via a communication network. The route may indicate the segments of the vehicle transportation network (e.g., the roads) that the autonomous vehicle will traverse and may further include metadata corresponding to the route. Examples of metadata of the route may include intersections, directions of traffic at the intersections, the amount of lanes at each route segment, and other suitable information.

At 5120, the autonomous vehicle operational management controller 4100 determines upcoming scenarios on the route. The autonomous vehicle operational management controller 4100 may pass the route to one or more of the operational environment monitors 4300. Each operational environment monitor 4300 may analyze the route to detect any potential upcoming scenarios on the route. For instance, the intersection operational environment monitor 4320 may parse the route to determine all the possible intersections. For each intersection, the intersection operational environment monitor 4320 may identify a type of intersection. For example, the intersection monitor 4320 may determine the number of roads intersecting, the right of way (if any), whether there are stop signs or traffic signals, and whether there is a crosswalk at the intersection. Each operational environment monitor 4300 may output zero or more upcoming scenarios to the autonomous vehicle operational management controller 4100. Each upcoming scenario may include a geolocation of the upcoming scenario and a type of the upcoming scenario. In some implementations, the type of the upcoming scenario may include one or more data fields that define the features of the upcoming scenario.

At 5130, the autonomous vehicle operational management controller 4100 ranks the upcoming scenarios based on the route. The autonomous vehicle operational management controller 4100 may receive upcoming scenarios from one or more of the operational environment monitors 4300. Initially, the operational environment monitors may identify upcoming scenarios that are expected along the route (e.g., known intersections, reported hazards, known lane merges, known pedestrian cross walks, etc.). Each upcoming scenario may include a geospatial location of the upcoming scenario and a type of the upcoming scenario. The type of the scenario may define one or more features of the upcoming scenario. The upcoming scenario may also have a criticality value associated therewith. The criticality value may indicate a degree of importance of the particular type of upcoming scenario. For example, an intersection of two main roads may have a greater criticality value than an intersection where road on which the autonomous vehicle is traveling has the right of way. In some implementations, the autonomous vehicle operational management controller 4100 determines a ranking score for each upcoming scenario. The autonomous vehicle operational management controller 4100 may determine a ranking score of an upcoming scenario based on the distance between the current location of the autonomous vehicle and the upcoming scenario and the criticality value associated with the upcoming scenario. In some implementations, the autonomous vehicle operational management controller 4100 may use a weighted function, a lookup table, or a machine learned model to determine the ranking score of an upcoming scenario. The autonomous vehicle operational management controller 4100 determines the ranking score of each upcoming scenario, and then may rank the upcoming scenarios based on their respective ranking scores. In some implementations, the autonomous vehicle operational management controller 4100 may form a queue of upcoming scenarios based on the rankings of the upcoming scenarios, where the highest ranked upcoming scenarios are located at or near the head of the queue (e.g., the most critical and/or nearest upcoming scenarios).

At 5140, the autonomous vehicle operational management controller 4100 selects one or more SSOCEMs to instantiate based on the rankings of the respective upcoming scenarios. In some implementations, the autonomous vehicle operational management controller 4100 selects the one or more highest ranked upcoming scenarios. The autonomous vehicle operational management controller 4100 may determine the amount of computational resources that are currently available to determine how many upcoming scenarios to select from the queue of upcoming scenarios. Based on the amount of computational resources that are available to the autonomous vehicle operational management controller 4100, the autonomous vehicle operational management controller 4100 selects one or more upcoming scenarios from the queue of upcoming scenarios.

At 5150, the autonomous vehicle operational management controller 4100 instantiates one or more SSOCEMs based on the selected upcoming scenario. For each selected upcoming scenario, the autonomous vehicle operational management controller 4100 instantiates a respective SSOCEM. In instantiating the SSOCEM, the autonomous vehicle operational management controller 4100 may pass the geolocation of the upcoming scenario, the current location of the vehicle, and a type of the upcoming scenario to the instance of the SSOCEM. The operation of an SSOCEM is described in greater detail with respect to FIG. 6.

At 5160, the autonomous vehicle operational management controller 4100 receives a candidate vehicle control action from one or more SSOCEMs. As each SSOCEM may be configured to handle a specific scenario, different SSOCEMs may provide different candidate vehicle control actions. For instance, a first SSOCEM may output a candidate vehicle control action to stop the autonomous vehicle, while a second SSOCEM may output a candidate vehicle control action to decelerate the autonomous vehicle.

At 5170, the autonomous vehicle operational management controller 4100 determines and executes a vehicle control action. The autonomous vehicle operational management controller 4100 may utilize any suitable techniques to determine a vehicle control action based on one or more candidate vehicle control actions. In some implementations, the autonomous vehicle operational management controller 4100 may implement hard-coded instructions to determine a vehicle control action. For instance, in some implementations, each candidate vehicle control action may have a confidence score associated therewith. In some of these implementations, the autonomous vehicle operational management controller 4100 may be configured to select the candidate vehicle control action having the highest confidence score. In some implementations, the autonomous vehicle operational management controller 4100 may select the candidate vehicle control action that is the least likely to cause a collision. In other implementations, the autonomous vehicle operational management controller 4100 may utilize a machine learned model to select the vehicle control action from a set of candidate vehicle control actions. Once selected, the autonomous vehicle operational management controller 4100 may execute the vehicle control action. For example, the autonomous vehicle operational management controller 4100 may determine one or more commands for one or more of the vehicle systems (e.g., the chassis system, braking system, steering system, and/or propulsion systems) to perform. Once determined, the autonomous vehicle operational management controller 4100 may issue the determined commands to the respective vehicle systems.

At 5180, the autonomous vehicle operational management controller 4100 may uninstantiate the instance(s) of the SSOCEM(s). Once a particular scenario is handled (e.g., the vehicle has passed the scenario), the autonomous vehicle operational management controller may uninstantiate any instances of SSOCEMs that were instantiated to handle the scenario. In this way, the autonomous vehicle operational management controller 4100 may free up computational resources that may be used to handle upcoming scenarios. As can be appreciated from the foregoing disclosure, by ranking the upcoming scenarios and instantiating respective SSOCEMs based on the rankings, the autonomous vehicle operational management controller 4100 is able to efficiently allocate computational resources of the autonomous vehicle. This may result in the autonomous vehicle being able to handle an increased amount of situations.

At 5190, the autonomous vehicle operational management controller 4100 determines whether there are any unexpected scenarios detected. While shown as occurring after operation 5180, operation 5190 may be a background process that is continuously executing. Detecting an unexpected scenario may include receiving operational environment data, including sensor data from the sensors of the vehicle system, and providing the operational environment data to the various operational environment monitors of the autonomous vehicle. If an operational environment monitor detects an unexpected upcoming scenario (e.g., a pedestrian, another vehicle, a non-human object, or the like), the operational environment monitor may output a notification of the unexpected upcoming scenario and a type of the unexpected upcoming scenario. In this case, the autonomous vehicle operational management controller 4100 may rerank the upcoming scenarios, as shown at 5130, whereby the unexpected upcoming scenario is included in the rankings. Reranking the upcoming scenarios may include recalculating the ranking scores for each of the previously ranked upcoming scenarios based on the current location of the vehicle, as well as calculating a ranking score for the unexpected upcoming scenario. If the operational environment monitors do not detect any unexpected upcoming scenarios, the autonomous vehicle operational management controller 4100 may continue to select SSOCEMs based on the rankings of the upcoming scenarios, as shown at 5140.

Figure 6:
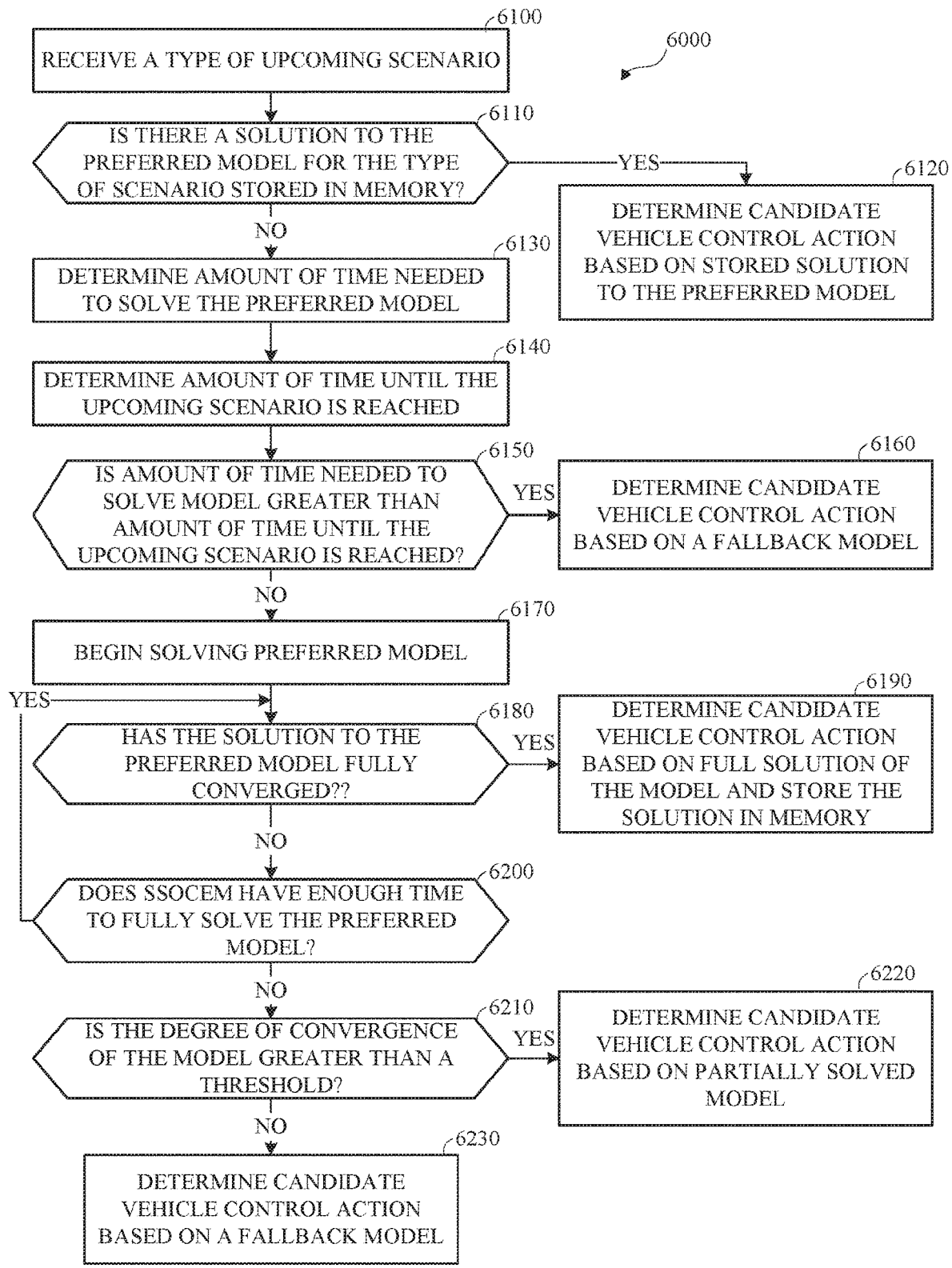
FIG. 6 is a flow diagram illustrating an example set of operations of a method for determining a candidate vehicle control action in accordance with some embodiments of the present disclosure.

FIG. 6 illustrates a set of operations of a method 6000 that are performed by an instance of a SSOCEM for determining a candidate vehicle action. For example, the method 6000 may be performed by the instances of the SSOCEMs of FIG. 4. While described with respect to the SSOCEMs of FIG. 4, the method may be performed by other SSOCEMs or analogous components.

At 6100, an instance of an SSOCEM receive a type of an upcoming scenario. The type of the upcoming scenario may define one or more features of the upcoming scenario. For example, a pedestrian-SSOCEM may receive a type of the pedestrian scenario describing whether a pedestrian is a jaywalker or crossing at a cross walk, a distance between the autonomous vehicle and the pedestrian, a trajectory of the pedestrian, and/or any other suitable features. In another example, an intersection SSOCEM may receive a type of an intersection scenario describing how many roads are intersecting, whether the intersection includes traffic lights or stop signs, whether the autonomous vehicle has a right of way, whether the autonomous vehicle can turn left or right, and/or any other suitable features. It should be understood that the type of intersection may be described in any other suitable manner. Furthermore, the features provided in the foregoing examples are examples of features, and not intended to limit the scope of the disclosure.

At 6110, the SSOCEM determines whether there is a solution to the preferred model for the type of the upcoming scenario stored in the memory of the autonomous vehicle. Put another way, the instance of the SSOCEM determines whether the autonomous vehicle has previously encountered a scenario of the same type (e.g., a substantially similar scenario) and full solution to the preferred model to handle the previously encountered scenario. In some implementations, the full solution to the preferred model is a full solution to a POMDP. If there is a full solution to the preferred model stored in memory, the SSOCEM retrieves the solution from the memory of the autonomous vehicle and determines a candidate vehicle control action based on the stored solution, as shown at 6120. In determining the candidate vehicle control action, the SSOCEM may receive operational environment information, including sensor data received from the vehicle sensors, and may input the operational environment information into the full solution to the preferred model. In response, the preferred model outputs a candidate vehicle control action. In some implementations, the preferred model may output one or more candidate vehicle control actions, and a respective confidence score for each of the one or more candidate vehicle control actions. In these implementations, the SSOCEM may select the candidate vehicle control action having the highest confidence score. The SSOCEM may output the candidate vehicle control action to the autonomous vehicle operational management controller.

If the SSOCEM determines that there is no solution to the preferred model for the type of the upcoming scenario, the SSOCEM determines an approximate amount of time needed to solve the preferred model (as shown at 6130), and determines an approximate amount of time until the upcoming scenario is reached (as shown at 6140). In some implementations, the amount of time needed to solve the model is stored as metadata with the SSOCEM. In other implementations, the SSOCEM may include a lookup table that relates types of scenarios to approximate solving times of models. In these implementations, the SSOCEM may look up the approximate solving time in the lookup table based on the type of the upcoming scenario. The SSOCEM may determine the approximate amount of time until the upcoming scenario is reached based on a distance between the autonomous vehicle and the upcoming scenario, the velocity of the vehicle, and the expected velocity of the autonomous vehicle as it traverses the portion of the vehicle transportation network between the autonomous vehicle and the upcoming scenario.

At 6150, the SSOCEM determines whether the approximate amount of time needed to solve the model is greater than the approximate amount of time until the upcoming scenario is reached. If the approximate amount of time needed to solve the model is greater than the approximate amount of time until the upcoming scenario is reached the SSOCEM determines the candidate vehicle control action based on a fallback model. In some implementations, the fallback models include a MDP and/or hardcoded expert logic. In the case that the fallback models include an MDP, the SSOCEM may still need to solve the MDP. Solving the MDP is much less complex than solving a POMDP, thereby reducing the amount of time to obtain a solution. Similarly, hard coded expert logic may define one or more vehicle control actions that are meant to reduce the likelihood of a collision. For example, the hardcoded expert logic may instruct the autonomous vehicle to pull over and relinquish control to the driver of the vehicle. In determining the candidate vehicle control action, the SSOCEM may receive operational environment information, including sensor data received from the vehicle sensors, and may input the operational environment information into a fallback model. In response, the fallback model outputs a candidate vehicle control action. The SSOCEM may output the candidate vehicle action to the autonomous vehicle operational management controller.

If the approximate amount of time needed to solve the model is less than the approximate amount of time until the upcoming scenario is reached, the SSOCEM begins solving the preferred model, as shown at 6170. DEFINE SOLVING THE MODEL.

At 6180, the SSOCEM determines whether the solution to the preferred model is fully converged. If the solution to the preferred model is fully converged, the SSOCEM determines the candidate vehicle control action based on the full solution to the preferred model and stores the full solution to the preferred in the memory of the autonomous vehicle, as shown at 6190. As previously discussed, determining the candidate vehicle control action includes receiving operational environment information, including sensor data received from the vehicle sensors, and inputting the operational environment information into the full solution to the preferred model. In response, the preferred model outputs a candidate vehicle control action. The SSOCEM may output the candidate vehicle control action to the autonomous vehicle operational management controller. Furthermore, the SSOCEM may store the full solution to the preferred model in the memory of the autonomous vehicle. The SSOCEM may indicate the type of scenario to which the solution corresponds and/or the features describing the scenario to which the solutions corresponds. In this way, the stored solution may be used to handle a scenario by another instance of the SSOCEM in the future.

In determining the candidate vehicle based on a partially solved model, the SSOCEM may receive operational environment information, including sensor data received from the vehicle sensors, and may input the operational environment information into the partial solution to the preferred model. In response, the partially solved model outputs a candidate vehicle control action. The SSOCEM may output the candidate vehicle action to the autonomous vehicle operational management controller.

In determining the candidate vehicle control action based on a fallback model, the SSOCEM may receive operational environment information, including sensor data received from the vehicle sensors, and may input the operational environment information into a fallback model. In response, the fallback model outputs a candidate vehicle control action. The SSOCEM may output the candidate vehicle action to the autonomous vehicle operational management controller.

If the solution to the preferred model has not fully converged at 6180, the SSOCEM determines whether the SSOCEM has enough time to fully solve the preferred model, as shown at 6200. The SSOCEM may determine the approximate amount of time until the autonomous vehicle reaches the upcoming scenario and the approximate amount of time needed to fully solve the model. The SSOCEM may determine the approximate amount of time until the autonomous vehicle reaches the upcoming scenario based on the distance between the autonomous vehicle and the upcoming scenario and the current velocity of the autonomous vehicle. The SSOCEM may determine the approximate amount of time needed to fully solve the model based on a degree of convergence of the solution. If the approximate amount of time to fully solve the preferred model is less than the approximate amount of time until the upcoming scenario is reached, then the SSOCEM continues to solve the preferred model. If, however, the approximate amount of time to solve the preferred model is greater than the approximate amount of time until the upcoming scenario is reached, the SSOCEM determines whether to rely on a fallback model or to rely on a partial solution to the preferred model. Thus, at 6210 the SSOCEM determines whether the degree of convergence of the solution to the preferred model is greater than a threshold (e.g., >80%). If the degree of convergence is greater than the threshold, the SSOCEM determines the candidate vehicle control action based on the partially solved model, as shown at 6220. If the degree of convergence is less than the threshold, the SSOCEM determines the candidate vehicle control action based on a fallback model, as shown at 6230.

The methods of FIG. 5 and FIG. 6 are provided for example. The methods may include additional and/or alternative operations. For example, the autonomous vehicle operational management controller or each SSOCEM may be configured to self-monitor for one or more error conditions. For example, if the SSOCEM cannot load or operate on the preferred model, the SSOCEM may identify an error condition. In the case of an error condition, the SSOCEM may rely on hardcoded logic that is intended to reduce the likelihood of a collision.

Additional Model Discussion

A MDP may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state may represent an identified condition, which may be an expected condition, of respective defined aspects, such as external objects and traffic control devices, of the operational environment of the autonomous vehicle that may probabilistically affect the operation of the autonomous vehicle at a discrete temporal location. For example, a remote vehicle operating in the proximity of the autonomous vehicle may affect the operation of the autonomous vehicle and may be represented in a MDP model, which may include representing an identified or expected geospatial location of the remote vehicle, an identified or expected path, heading, or both of the remote vehicle, an identified or expected velocity of the remote vehicle, an identified or expected acceleration or deceleration rate of the remote vehicle, or a combination thereof corresponding to the respected temporal location. At instantiation, the current state of the MDP model may correspond to a contemporaneous state or condition of the operating environment. A respective set of states may be defined for each distinct vehicle operational scenario.

Although any number or cardinality of states may be used, the number or cardinality of states included in a model may be limited to a defined maximum number of states, such as 300 states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the autonomous vehicle, as represented by the states, responsive to the actions. For example, a state transition probability may indicate a probability that the operational environment of the autonomous vehicle corresponds to a respective state at a respective temporal location immediately subsequent to a current temporal location corresponding to a current state in response to traversing the vehicle transportation network by the autonomous vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

Examples of state transition probabilities associated with a pedestrian vehicle operational scenario may include a defined probability of a pedestrian jaywalking, which may be based on a geospatial distance between the pedestrian and the respective road segment; a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with a an intersection vehicle operational scenario.

Examples of state transition probabilities associated with a lane change vehicle operational scenario may include a defined probability of a remote vehicle changing velocity, such as a defined probability of a remote vehicle behind the autonomous vehicle increasing velocity or a defined probability of a remote vehicle in front of the autonomous vehicle decreasing velocity; a defined probability of a remote vehicle in front of the autonomous vehicle changing lanes; a defined probability of a remote vehicle proximate to the autonomous vehicle changing speed to allow the autonomous vehicle to merge into a lane; or any other probabilities associated with a lane change vehicle operational scenario.

The reward function may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state.

The reward function may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

A Partially Observable Markov Decision Process (POMDP) model may be similar to a Markov Decision Process model, except that a POMDP model may include modeling uncertain states. A POMDP model may include modeling confidence, sensor trustworthiness, distraction, noise, uncertainty, such as sensor uncertainty, or the like. A POMDP model may utilize more computational resources and may more accurately model the distinct vehicle operational scenario than a MDP model.

A POMDP model may model a distinct vehicle operational scenario using a set of states, a set of states, a set of actions, a set of state transition probabilities, a reward function, a set of observations, a set of conditional observation probabilities, or a combination thereof. The set of states, the set of actions, the set of state transition probabilities, and the reward function may be similar to those described above with respect to the MDP model.

The set of observations may include observations corresponding to respective states. An observation may provide information about the attributes of a respective state. An observation may correspond with a respective temporal location. An observation may include operational environment information, such as sensor data. An observation may include expected or predicted operational environment information.

For example, a POMDP model may include an autonomous vehicle at a first geospatial location and first temporal location corresponding to a first state, the model may indicate that the autonomous vehicle may identify and perform, or attempt to perform, a vehicle control action to traverse the vehicle transportation network from the first geospatial location to a second geospatial location at a second temporal location immediately subsequent to the first temporal location, and the set of observations corresponding to the second temporal location may include the operational environment information that may be identified corresponding to the second temporal location, such as geospatial location information for the autonomous vehicle, geospatial location information for one or more external objects, probabilities of availability, expected path information, or the like.

The set of conditional observation probabilities may include probabilities of making respective observations based on the operational environment of the autonomous vehicle. For example, an autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. In some embodiments, the operational environment information may be inaccurate, incomplete, or erroneous. In a MDP model, the autonomous vehicle may non-probabilistically identify the remote vehicle, which may include identifying a location of the remote vehicle, an expected path for the remote vehicle, or the like, and the identified information, such as the identified location of the remote vehicle, based on inaccurate operational environment information, may be inaccurate or erroneous. In a POMDP model the autonomous vehicle may identify information probabilistically identifying the remote vehicle, which may include probabilistically identifying location information for the remote vehicle, such as location information indicating that the remote vehicle may be proximate to the intersection. The conditional observation probability corresponding to observing, or probabilistically identifying, the location of the remote vehicle may represent the probability that the identified operational environment information accurately represents the location of the remote vehicle.

The set of conditional observation probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

A Decentralized Partially Observable Markov Decision Process (Dec-POMDP) model, which may be a multi-agent model may model a distinct vehicle operational scenario. A Dec-POMDP model may be similar to a POMDP model except that a POMDP model may model the autonomous vehicle and a subset, such as one, of external objects and Dec-POMDP model may model the autonomous vehicle and the set of external objects.

A Classical Planning (CP) model, which may be a single-agent model, may model a distinct vehicle operational scenario based on a defined input state, which may indicate respective non-probabilistic states of the elements of the operational environment of the autonomous vehicle for the distinct vehicle operational scenario modeled by the SSO-CEMs 4400. In a CP model, one or more aspects, such as geospatial location, of modeled elements, such as external objects, associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distance, such as a defined number of meters, along an expected path for the remote vehicle.

A Partially Observable Stochastic Game (POSG) model, which may be a multi-agent model, may model a distinct vehicle operational scenario. A POSG model may be similar to a Dec-POMDP except that the Dec-POMDP model may include a reward function for the autonomous vehicle and the POSG model may include the reward function for the autonomous vehicle and a respective reward function for each external object.

In some implementations, a preferred or fallback model may be a Reinforcement Learning (RL) model, which may be a learning model, and which may model a distinct vehicle operational scenario. A RL model may be similar to a MDP model or a PPOMDP model except that defined state transition probabilities, observation probabilities, reward function, or any combination thereof, may be omitted from the model.

A RL model may be a model-based RL model, which may include generating state transition probabilities, observation probabilities, a reward function, or any combination thereof based on one or more modeled or observed events.

In a RL model, the model may evaluate one or more events or interactions, which may be simulated events, such as traversing an intersection, traversing a vehicle transportation network near a pedestrian, or changing lanes, and may generate, or modify, a corresponding model, or a solution thereof, in response to the respective event. For example, the autonomous vehicle may traverse an intersection using a RL model. The RL model may indicate a candidate vehicle control action for traversing the intersection. The autonomous vehicle may traverse the intersection using the candidate vehicle control action as the vehicle control action for a temporal location. The autonomous vehicle may determine a result of traversing the intersection using the candidate vehicle control action, and may update the model based on the result.

In an example, at a first temporal location a remote vehicle may be stationary at an intersection with a prohibited right-of-way indication, such as a red light, the RL model may indicate a 'proceed' candidate vehicle control action for the first temporal location, the RL model may include a probability of identifying operational environment information at a subsequent temporal location, subsequent to traversing the vehicle transportation network in accordance with the identified candidate vehicle control action, indicating that a geospatial location of the remote vehicle corresponding to the first temporal location differs from a geospatial location of the remote vehicle corresponding to the second temporal location is low, such as 0/100. The autonomous vehicle may traverse the vehicle transportation network in accordance with the identified candidate vehicle control action, may subsequently determine that the geospatial location of the remote vehicle corresponding to the first temporal location differs from the geospatial location of the remote vehicle corresponding to the second temporal location, and may modify, or update, the probability accordingly incorporate the identified event, such as to 1/101.

In another example, the RL model may indicate a defined positive expected reward for traversing the vehicle transportation network from a first temporal location to a second temporal location in accordance with an identified vehicle control action and in accordance with identified operational environment information, which may be probabilistic. The autonomous vehicle may traverse the vehicle transportation network in accordance with the identified vehicle control action. The autonomous vehicle may determine, based on subsequently identified operational environment information, which may be probabilistic, that the operational environment information corresponding to the second temporal location is substantially similar to the operational environment information identified corresponding to the first temporal location, which may indicate a cost, such as in time, of traversing the vehicle transportation network in accordance with the identified vehicle control action, and the RL model may reduce the corresponding expected reward.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
traversing, by an autonomous vehicle, a vehicle transportation network from an origin to a destination, wherein traversing the vehicle transportation network includes:
identifying a distinct vehicle operational scenario, wherein traversing the vehicle transportation network includes traversing a portion of the vehicle transportation network that includes the distinct vehicle operational scenario;
instantiating a scenario-specific operational control evaluation module, wherein the scenario-specific operational control evaluation module includes a first scenario-specific operational control evaluation model of the distinct vehicle operational scenario and a second scenario-specific operational control evaluation model of the distinct vehicle operational scenario, wherein the second scenario-specific operational control evaluation model is less computationally expensive to solve than the first scenario-specific operational control evaluation model;
determining whether an amount of time to solve the first scenario-specific operational control evaluation model is greater than an amount of time for the autonomous vehicle to reach the distinct vehicle operational scenario;
in response to a determination that the amount of time to solve the first scenario-specific operational control evaluation model is less than the amount of time for the autonomous vehicle to reach the distinct vehicle operational scenario, receiving a candidate vehicle control action from a solution for the first scenario-specific operational control evaluation model;
in response to a determination that the amount of time to solve the first scenario-specific operational control evaluation model is greater than the amount of time for the autonomous vehicle to reach the distinct vehicle operational scenario, receiving the candidate vehicle control action from a solution for the second scenario-specific operational control evaluation model; and traversing a portion of the vehicle transportation network in accordance with the candidate vehicle control action.

2. The method of claim 1, wherein determining whether the amount of time to solve the first scenario-specific operational control evaluation model is greater than the amount of time for the autonomous vehicle to reach the distinct vehicle operational scenario includes:
   determining whether the solution for the first scenario-specific operational control evaluation model is available;
   in response to a determination that the solution for the first scenario-specific operational control evaluation model is available, determining that the amount of time to solve the first scenario-specific operational control evaluation model is less than the amount of time for the autonomous vehicle to reach the distinct vehicle operational scenario; and
   in response to a determination that the solution for the first scenario-specific operational control evaluation model is unavailable, determining the amount of time to solve the first scenario-specific operational control evaluation model.

3. The method of claim 2, wherein receiving the candidate vehicle control action from the solution for the first scenario-specific operational control evaluation model includes:
   in response to the determination that the solution for the first scenario-specific operational control evaluation model is unavailable, generating the solution for the first scenario-specific operational control evaluation model by solving the first scenario-specific operational control evaluation model.

4. The method of claim 1, wherein identifying the distinct vehicle operational scenario includes:
   identifying a plurality of distinct vehicle operational scenarios;
   ranking the plurality of distinct vehicle operational scenarios; and
   identifying the highest ranking distinct vehicle operational scenario from the plurality of distinct vehicle operational scenarios as the distinct vehicle operational scenario.

5. The method of claim 4, wherein identifying the plurality of distinct vehicle operational scenarios includes:
   identifying a route for traversing the vehicle transportation network from the origin to the destination, wherein the route includes a plurality of segments of the vehicle transportation network; and
   identifying at least one distinct vehicle operational scenario from the plurality of distinct vehicle operational scenarios based on the route.

6. The method of claim 5, wherein identifying the plurality of distinct vehicle operational scenarios includes:
   identifying an unexpected distinct vehicle operational scenario; and
   including the unexpected distinct vehicle operational scenario in the plurality of distinct vehicle operational scenarios.

7. The method of claim 1, wherein the first scenario-specific operational control evaluation model is a Partially Observable Markov Decision Process model and the second scenario-specific operational control evaluation model is a Markov Decision Process model.

8. An autonomous vehicle comprising:
   a non-transitory computer readable medium including instructions for traversing a vehicle transportation network;
   a trajectory controller configured to operate the autonomous vehicle; and
   a processor configured to execute the instructions stored on the non-transitory computer readable medium to:
      identify a distinct vehicle operational scenario, wherein traversing the vehicle transportation network includes traversing a portion of the vehicle transportation network that includes the distinct vehicle operational scenario;
      instantiate a scenario-specific operational control evaluation module, wherein the scenario-specific operational control evaluation module includes a first scenario-specific operational control evaluation model of the distinct vehicle operational scenario and a second scenario-specific operational control evaluation model of the distinct vehicle operational scenario, wherein the second scenario-specific operational control evaluation model is less computationally expensive to solve than the first scenario-specific operational control evaluation model;
      determine whether an amount of time to solve the first scenario-specific operational control evaluation model is greater than an amount of time for the autonomous vehicle to reach the distinct vehicle operational scenario;
      in response to a determination that the amount of time to solve the first scenario-specific operational control evaluation model is less than the amount of time for the autonomous vehicle to reach the distinct vehicle operational scenario, receive a candidate vehicle control action from a solution for the first scenario-specific operational control evaluation model;
      in response to a determination that the amount of time to solve the first scenario-specific operational control evaluation model is greater than the amount of time for the autonomous vehicle to reach the distinct vehicle operational scenario, receive the candidate vehicle control action from a solution for the second scenario-specific operational control evaluation model; and
      output the candidate vehicle control action to the trajectory controller as a vehicle control action such that the trajectory controller controls the autonomous vehicle to traverse the portion of the vehicle transportation network in accordance with the vehicle control action.

9. The autonomous vehicle of claim 8, wherein the processor is configured to execute the instructions stored on the non-transitory computer readable medium to determine whether the amount of time to solve the first scenario-specific operational control evaluation model is greater than the amount of time for the autonomous vehicle to reach the distinct vehicle operational scenario by:
   determining whether the solution for the first scenario-specific operational control evaluation model is available;
   in response to a determination that the solution for the first scenario-specific operational control evaluation model is available, determining that the amount of time to solve the first scenario-specific operational control evaluation model is less than the amount of time for the autonomous vehicle to reach the distinct vehicle operational scenario; and
   in response to a determination that the solution for the first scenario-specific operational control evaluation model is unavailable, determining the amount of time to solve the first scenario-specific operational control evaluation model.

10. The autonomous vehicle of claim 9, wherein the processor is configured to execute the instructions stored on the non-transitory computer readable medium to receive the candidate vehicle control action from the solution for the first scenario-specific operational control evaluation model by:
  in response to the determination that the solution for the first scenario-specific operational control evaluation model is unavailable, generating the solution for the first scenario-specific operational control evaluation model by solving the first scenario-specific operational control evaluation model.

11. The autonomous vehicle of claim 8, wherein the processor is configured to execute the instructions stored on the non-transitory computer readable medium to identify the distinct vehicle operational scenario by:
  identifying a plurality of distinct vehicle operational scenarios;
  ranking the plurality of distinct vehicle operational scenarios; and
  identifying the highest ranking distinct vehicle operational scenario from the plurality of distinct vehicle operational scenarios as the distinct vehicle operational scenario.

12. The autonomous vehicle of claim 11, wherein the processor is configured to execute the instructions stored on the non-transitory computer readable medium to identify the plurality of distinct vehicle operational scenarios by:
  identifying a route for traversing the vehicle transportation network from the origin to the destination, wherein the route includes a plurality of segments of the vehicle transportation network; and
  identifying at least one distinct vehicle operational scenario from the plurality of distinct vehicle operational scenarios based on the route.

13. The autonomous vehicle of claim 12, wherein the processor is configured to execute the instructions stored on the non-transitory computer readable medium to identify the plurality of distinct vehicle operational scenarios by:
  identifying an unexpected distinct vehicle operational scenario; and
  including the unexpected distinct vehicle operational scenario in the plurality of distinct vehicle operational scenarios.

14. The autonomous vehicle of claim 8, wherein the first scenario-specific operational control evaluation model is a Partially Observable Markov Decision Process model and the second scenario-specific operational control evaluation model is a Markov Decision Process model.

15. A method for use in traversing a vehicle transportation network, the method comprising:
  traversing, by an autonomous vehicle, a vehicle transportation network from an origin to a destination, wherein traversing the vehicle transportation network includes:
    identifying a route for traversing the vehicle transportation network from the origin to the destination;
    identifying distinct vehicle operational scenarios based on the route, wherein traversing the vehicle transportation network includes traversing the distinct vehicle operational scenarios;
    ranking the distinct vehicle operational scenarios;
    identifying the highest ranking distinct vehicle operational scenario from the distinct vehicle operational scenarios;
    instantiating a scenario-specific operational control evaluation module, wherein the scenario-specific operational control evaluation module includes a first scenario-specific operational control evaluation model of the highest ranking distinct vehicle operational scenario, and a second scenario-specific operational control evaluation model of the highest ranking distinct vehicle operational scenario, wherein the second scenario-specific operational control evaluation model is less computationally expensive to solve than the first scenario-specific operational control evaluation model;
    determining whether an amount of time to solve the first scenario-specific operational control evaluation model is greater than an amount of time for the autonomous vehicle to reach the highest ranking distinct vehicle operational scenario;
    in response to a determination that the amount of time to solve the first scenario-specific operational control evaluation model is less than the amount of time for the autonomous vehicle to reach the highest ranking distinct vehicle operational scenario, receiving a candidate vehicle control action from a solution for the first scenario-specific operational control evaluation model;
    in response to a determination that the amount of time to solve the first scenario-specific operational control evaluation model is greater than the amount of time for the autonomous vehicle to reach the highest ranking distinct vehicle operational scenario, receiving the candidate vehicle control action from a solution for the second scenario-specific operational control evaluation model; and
  traversing a portion of the vehicle transportation network including the highest ranking distinct vehicle operational scenario in accordance with the candidate vehicle control action.

* * * * *